(12) United States Patent  (10) Patent No.: US 6,709,733 B2
Krenik  (45) Date of Patent: Mar. 23, 2004

(54) LAMINATED WOOD PANEL

(76) Inventor: William Robert Krenik, 5909 Indian Hills Dr., Garland, TX (US) 75044

( * ) Notice: Subject to any disclaimer, the term of this patent is extended or adjusted under 35 U.S.C. 154(b) by 0 days.

(21) Appl. No.: 10/223,491

(22) Filed: Aug. 19, 2002

(65) Prior Publication Data

US 2003/0124307 A1 Jul. 3, 2003

Related U.S. Application Data

(60) Provisional application No. 60/342,800, filed on Dec. 20, 2001.

(51) Int. Cl.[7] ............................. B32B 3/10; B32B 3/14; B44F 7/00; B44F 9/00
(52) U.S. Cl. .......................... 428/151; 428/50; 428/54; 428/87; 52/313
(58) Field of Search .............................. 428/50, 54, 87, 428/151; 52/313

(56) References Cited

U.S. PATENT DOCUMENTS

| 108,781 A | | 11/1870 | Hamilton |
| 162,046 A | * | 4/1875 | Fenn ............................ 52/313 |
| 436,041 A | | 9/1890 | Koskul |
| 1,028,703 A | | 6/1912 | Fulton |
| 1,078,776 A | | 11/1913 | Dunton |
| 2,118,841 A | * | 5/1938 | Elmendorf ................... 52/313 |
| 2,732,597 A | * | 1/1956 | Contratto ................... 52/590.2 |
| 3,700,533 A | * | 10/1972 | Schmitz ........................ 428/46 |
| 3,905,172 A | * | 9/1975 | Blackburn ............... 52/745.05 |
| 5,213,861 A | | 5/1993 | Severson et al. |
| 5,322,584 A | | 6/1994 | Severson et al. |
| 5,681,639 A | | 10/1997 | Minagawa et al. |
| 5,758,557 A | | 6/1998 | Moreton et al. |
| 6,428,871 B1 | | 8/2002 | Cozzolino |
| 6,576,079 B1 | * | 6/2003 | Kai ............................ 156/182 |
| 6,594,930 B1 | * | 7/2003 | Segan et al. ................... 40/503 |

OTHER PUBLICATIONS

Jim Adams, Intarsia 101—A Beginners Guide to Wood Inlay, http://www.intarsia.net/e-book/Intarsia101.htm.
Quentin Smith, Marquetry—A Beginner's Guide, 1995 http://www.staffsmarq.freeserve.co.uk/guide2.htm.

* cited by examiner

*Primary Examiner*—Harold Pyon
*Assistant Examiner*—Patricia L. Nordmeyer

(57) ABSTRACT

A wood panel formed by cutting a layer from a laminated blank formed by bonding wood pieces of various colors, shapes, textures, or grain patterns to create artistic effects in the completed panel through use of several alternative construction techniques, and techniques for providing enhancing modifications and low-stress means for mounting the completed panels.

26 Claims, 12 Drawing Sheets

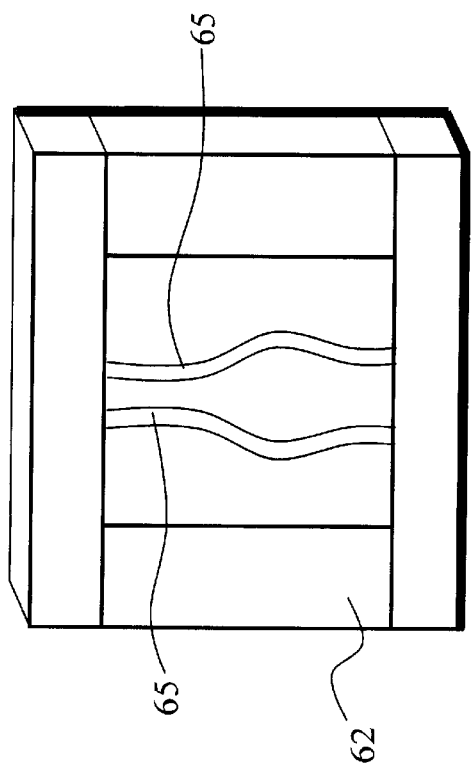
Figure 6-b.
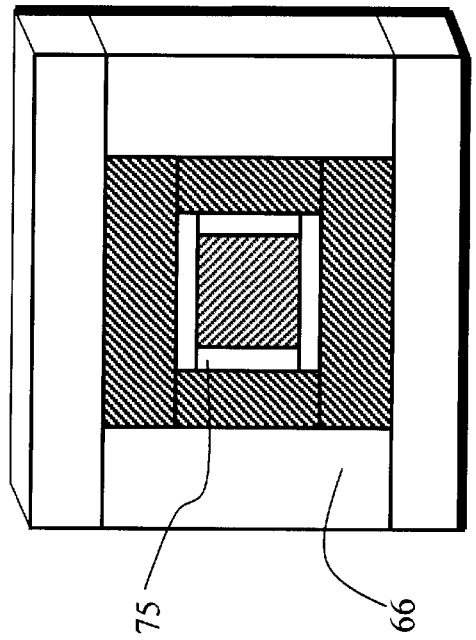
Figure 6-d.
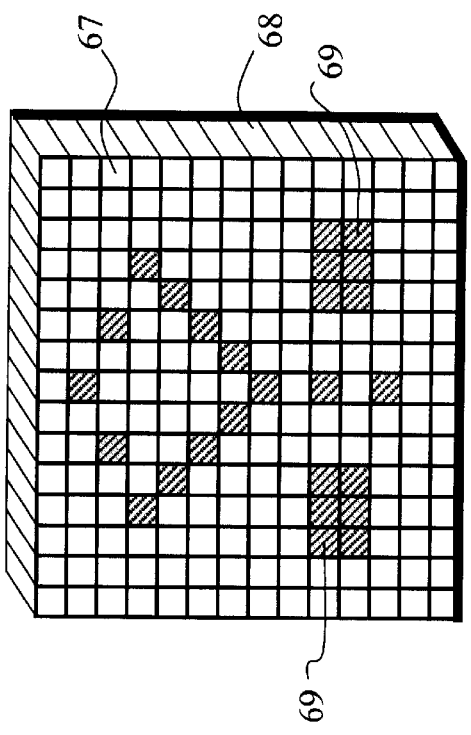
Figure 6-a.
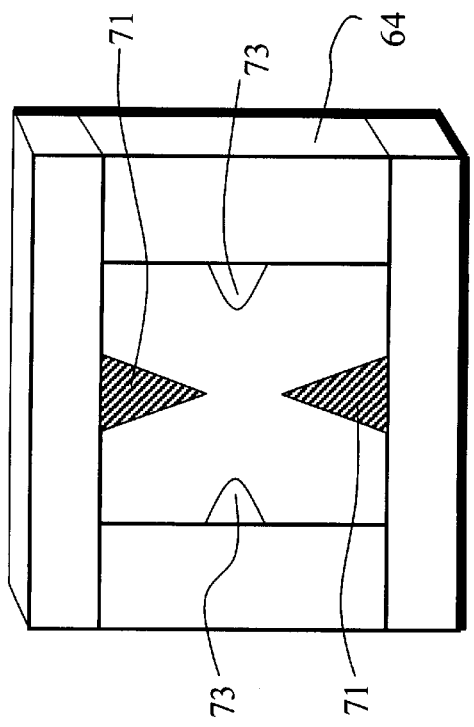
Figure 6-c.

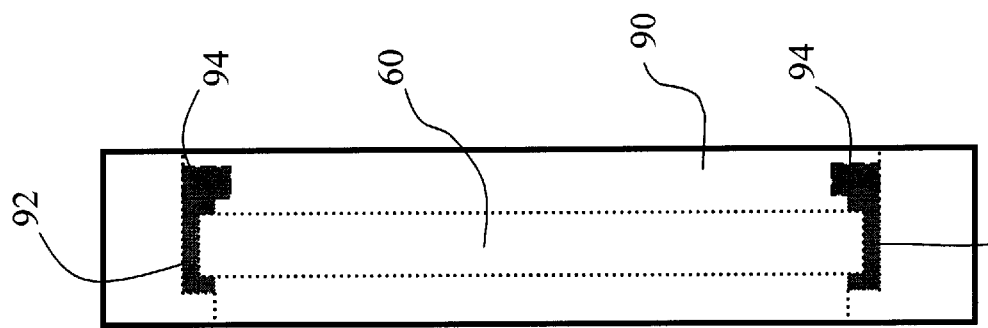
Figure 8-b.
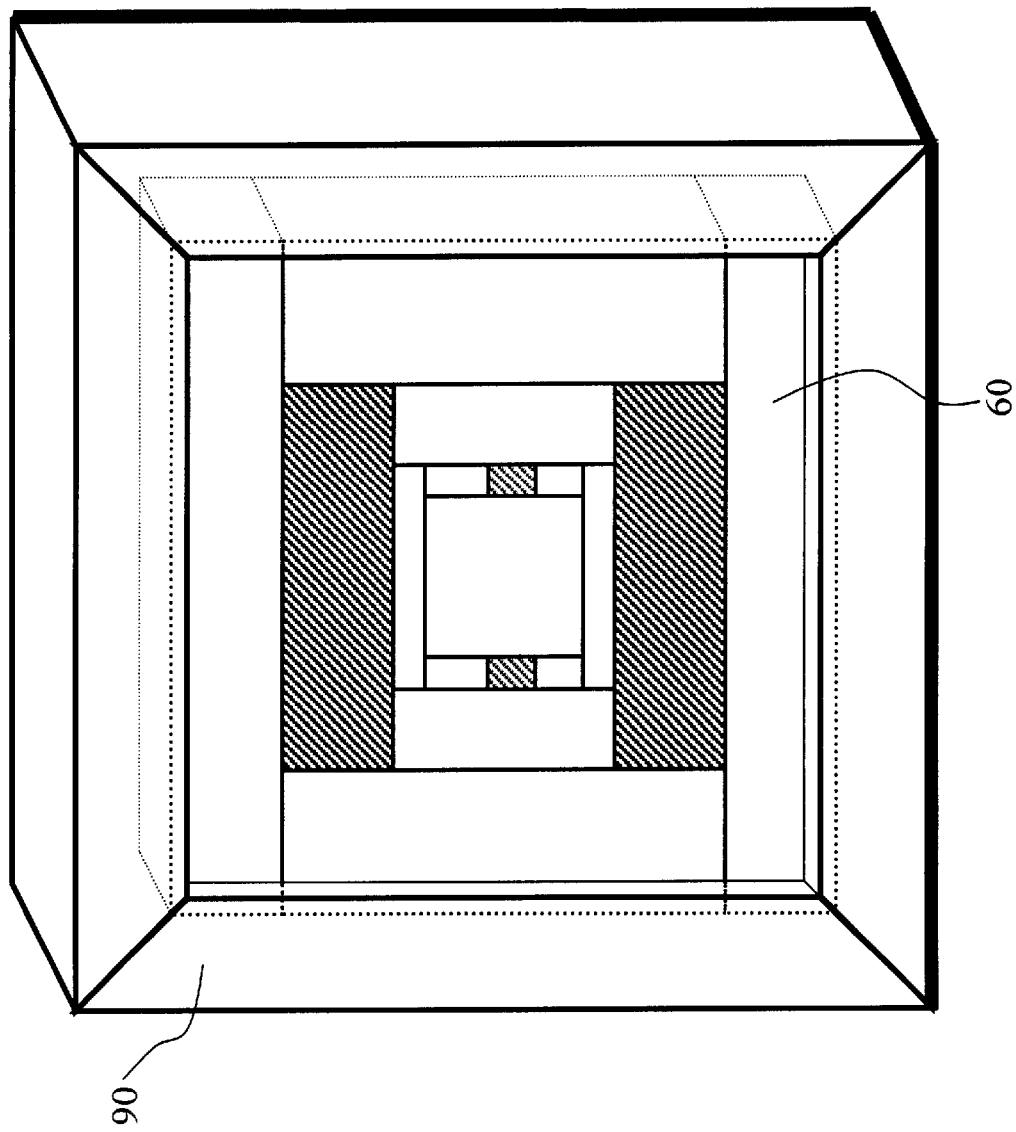
Figure 8-a.

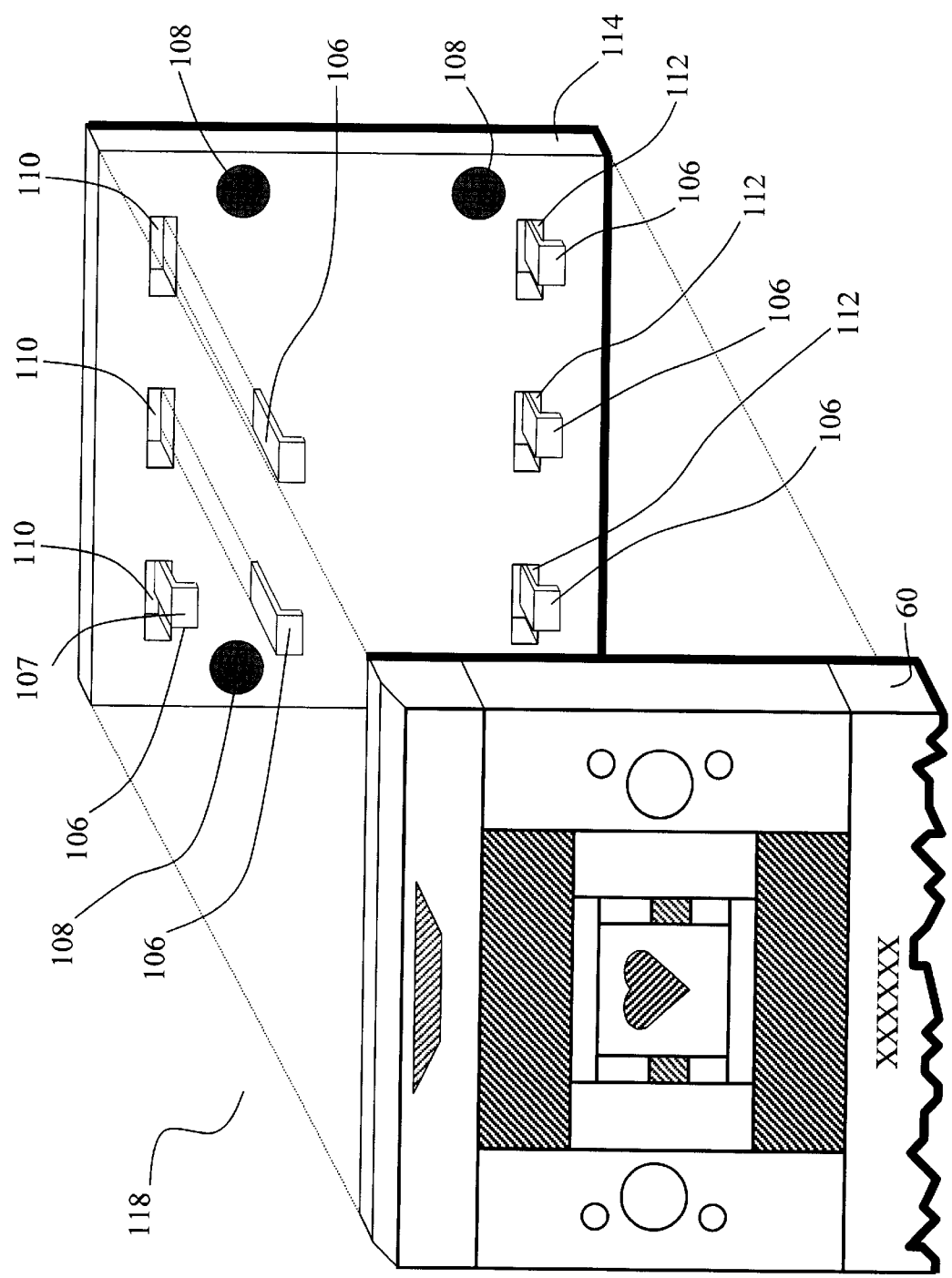
Figure 11-a.

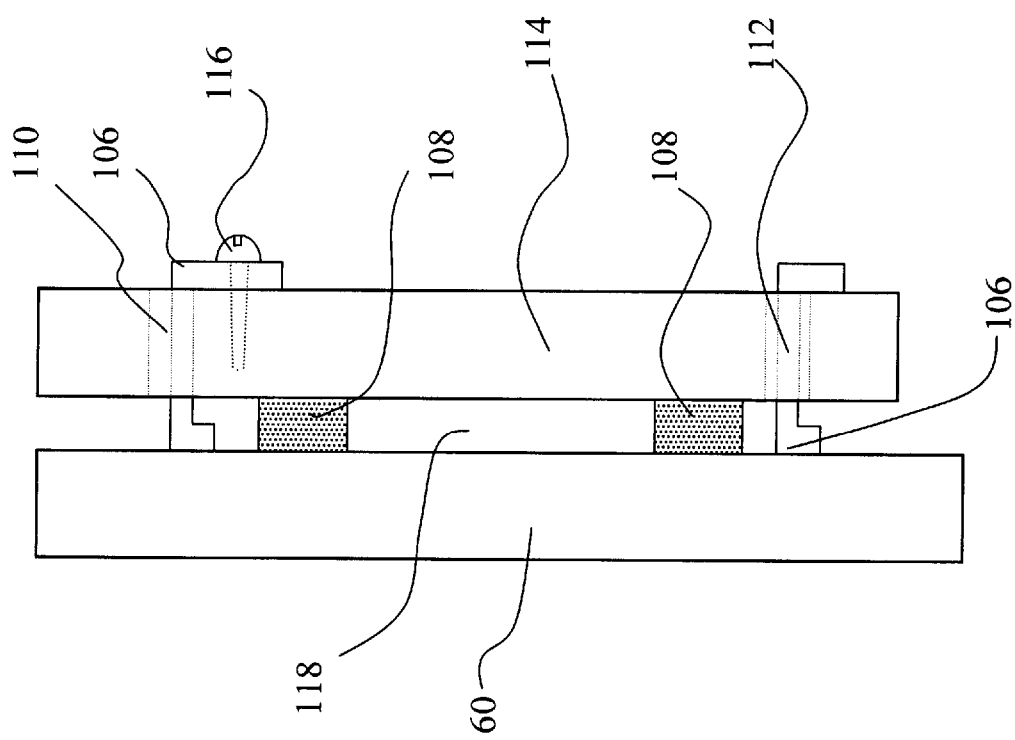
Figure 11-b.

LAMINATED WOOD PANEL

SPECIFIC REFERENCE TO PROVISIONAL APPLICATION

The applicant claims priority of Provisional Patent Application No. 60/342,800 entitled Laminated Wood Panel, by inventor William R. Krenik, Garland, Tex. that was filed on Dec. 20, 2001.

BACKGROUND

1. Field of the Invention

This invention relates to panels for artwork and display purposes, specifically to such panels that are produced using layers cut from a laminated wood blank.

2. Description of Prior Art

A wide variety of methods are commonly used for creating artwork. Artwork, in this patent application, refers to any article created for the purpose of visual display. Normally, materials that are highly consistent and dimensionally stable are chosen for artwork as they are relatively easy to work with. However, some materials exist that are not consistent or dimensionally stable, but offer high esthetic value and hence, are highly valued for use in artwork. Specifically, wood offers a large variety of grain patterns, textures, and colors that are often desired for artwork. By its nature, however, wood changes its dimensions with variations in temperature and/or humidity and can warp, twist, check, or crack over time.

Consequently, a number of techniques have been developed that allow wooden artwork to be produced in spite of the problems associated with the nature of wood. To understand them, it is important to first better understand the nature of wood. Of course, wood is a natural product that is harvested from trees by cutting a growing tree into pieces. Wooden boards are cut along the length of a tree's trunk so that the wooden fibers in a board generally extend along the length of the board. Changes in temperature and/or humidity cause the fibers to expand or contract significantly in their radial dimension, but only slightly along their length. Consequently, a common wooden board exposed to changes in temperature and/or humidity will significantly vary in thickness and width, but will vary only slightly in length.

It is also helpful to define end-grain and long-grain. End-grain is the pattern observed in a piece of wood when it is viewed from a surface displaying the ends of the wood's fiber. Long-grain is the pattern observed in a piece of wood when it is viewed from a surface displaying the sides of the wood's fiber. Direction is commonly associated with long-grain patterns and the grain is said to run in the direction of the wood's fiber. Consider a common board, cut from a log taken from a tree, end-grain is visible on the ends of the board and long-grain runs along the length of the board and is visible on the top, bottom and side surfaces of the board. Of course, wooden pieces can be cut at odd angles to the dimensions of a tree's trunk and wood fiber does not run perfectly straight in any piece of wood. However, end-grain is normally used to describe cases where the surface of a piece displays mainly the fiber ends and long-grain in cases where the surface of a piece displays mainly the fiber sides. Similarly, the long-grain is said to run in the direction that the fiber mainly points in, in aggregate, over the piece of wood under consideration.

A principal disadvantage of all prior art is that none of the presently available techniques for creating wooden artwork allow large areas of end-grain to be visible in a wood panel. For most methods, small areas are possible. However, problems with the differences in expansion and contraction of the dimensions of a wood piece across its end-grain versus its long-grain make construction with large areas of visible end-grain extremely difficult. In particular, it is very difficult to display more than a few inches of end-grain without incurring problems with warping or cracking.

Inlay is a common technique used to mix pieces of wood offering variety in color, texture, grain pattern, or other desired features. Inlay involves cutting a pattern into a first piece of wood or wooden article and then filling the pattern with a piece or multiple pieces of wood cut from other pieces of wood and bonding them into the cut pattern. The piece or pieces used to fill the cut pattern are said to be "inlayed" into the first piece. In addition to wood, metals, stone, or other materials can be inlayed into wooden pieces and wood can be inlayed into pieces made from other materials. In inlay, long-grain is normally inlayed into long-grain. It is possible to inlay end-grain into long-grain or vice versa. However, only very small end-grain pieces are possible as the differences in expansion/contraction of the pieces can easily result in cracking of either the inlay or the first piece. Inlay is a very well-know technique and has been used for hundreds of years. However, inlay is very time consuming and labor intensive and a high degree of skill is required to produce a quality result. Consequently, inlay is normally only suitable for expensive products that include little or no visible end-grain.

A second technique for creating wooden artwork is marquetry. Marquetry is a process for shaping thin layers of wood, veneers, into desired patterns and bonding them to a stable substrate that is normally, but not necessarily, also made of wood. Marquetry avoids problems with warping, cracking, etc. by using thin veneers that are strongly bonded to the substrate. Since the veneers are so thin, they cannot induce sufficient levels of stress to warp or crack the substrate or break the bonds between the veneer and the substrate. Consequently, neither the veneer nor the substrate crack and the completed piece is stable. The long-grain surface of the veneer is normally used. End-grain can be displayed only if the pieces are kept very small to avoid cracking. Most notably, end-grain patterns are sometimes used in this way to decorate classical guitars, usually around the sound holes and over the bridge. However, in all cases, the end-grain patterns have to be kept very small. Marquetry is also a very time consuming and labor intensive process that requires high skill levels. It is only suitable for relatively expensive pieces.

A third technique for creating wooden artwork into patterns is intarsia. Intarsia can be considered similar to marquetry in that wooden pieces are shaped to fit together and then are bonded to a substrate. However, with intarsia, the pieces are not normally thin veneers, but rather, are thicker pieces that are not only shaped to fit with each other, but are also textured and/or contoured to create desired effects. A completed intarsia piece is similar, in some sense, to a relief carving, but is made from multiple pieces that are contoured (or carved) prior to final assembly. As with inlay and marquetry, intarsia is difficult, time-consuming, and relatively expensive.

Of course, wooden pieces of various colors, textures, grain-patterns, etc., can be simply bonded together to form desired patterns. Normally, long-grain is bonded to long-grain in such pieces to avoid cracking, but very small patterns can be formed using some end-grain if stress is properly accounted for. As with the techniques above, such constructions are normally time-consuming and expensive if complex patterns are involved.

It is also common practice to create patterns with wood using carving, engraving, or contouring; or by painting or staining patterns onto the wooden surface. These techniques can be inexpensive and produce interesting patterns. However, the desired effects obtained from combining varieties of wood with different colors, textures, grain-patterns, etc. is not realized. It is also possible to combine the techniques described above. For example, an intarsia piece might have an additional pattern engraved into it. However, again, such combination of techniques does not solve the problem of the processes being expensive and time-consuming or provide a technique for allowing end-grain patterns to be provided.

SUMMARY

The first aspect of this invention is for wooden panels formed by creating a blank made from pieces of wood bonded together with their long-grain surfaces bonded to the long-grain surfaces of other pieces making up the blank; and then cutting layers from an end of the blank to form multiple panels with an end-grain pattern visible on their face. A second aspect of this invention is combining metals, ceramics, plastics or other materials into the blank. A third aspect of this invention is to carve, cut, break, drill, bore, puncture, etch, engrave, paint, stain, inlay or otherwise make enhancing modifications to the panel before or after the layer has been cut. A fourth aspect of this invention is to frame, support, or mount the panel in such way as to avoid stress in the panel and reduce the likelihood of cracking it.

OBJECTS AND ADVANTAGES

Several objects and advantages of the present invention are:

a) to provide a panel cut from a blank with an artistic pattern composed of the end-grain of multiple pieces of wood that is resistant to cracking and can be produced economically;

b) to provide a panel cut from a blank cut that is formed by bonding layers of wood on top of each other or around a center piece;

c) to provide a panel cut from a blank that is formed by bonding layers of wood to each other to form a larger blank, and singly or multiply cutting the resulting blank into sections and including a layer or layers between the cut sections before bonding them back together, and optionally bonding additional layers around the resulting blank;

d) to provide a panel cut from a blank that is formed by bonding layers of wood to each other to form a larger blank, and singly or multiply cutting or routing the larger blank and optionally filling the cuts or routed areas with materials, and optionally bonding additional layers around the resulting blank;

e) to provide a panel cut from a blank that is formed by bonding a multitude of smaller pieces together, whether or not the smaller pieces fit together precisely, to form a larger blank or subassembly for a blank;

f) to provide a panel cut from a blank where the blank includes layers of metal, ceramic, plastic, or other materials bonded with the wooden layers;

g) to provide a panel cut from a blank that is formed using a combination of the techniques described in items b) through f) above;

h) to provide a wooden panel cut from an end of a blank formed by bonding layers of wood and further engraving, drilling, carving, routing, painting, staining, etching, cutting, breaking, boring, puncturing, texturing, machining, countouring, inlaying, or otherwise making enhancing modifications to the panel before or after it is cut from the blank;

i) to provide a wooden panel cut from the end of a blank formed by bonding layers of wood and further reinforcing the panel before or after it is cut from the blank;

j) to provide a means for framing, mounting, or supporting the panel that does not impose significant levels of stress on the panel to minimize the possibility of cracking it.

k) to provide a means for mounting and supporting the panel that does not impose significant levels of stress on the panel to minimize the possibility of cracking it and allows for thinner and larger panels to be utilized than would otherwise be possible.

DRAWING FIGURES

FIG. 6-a shows a panel cut from a blank that was formed from a multitude of pieces in a single bonding operation.

FIG. 6-b shows a panel cut from a blank with a center that has been cut into sections and reassembled with additional layers included between the sections.

FIG. 6-c shows a panel cut from a blank with a center piece that has had some material removed to form specially shaped features along it's length; two of the features are filled with dark material, the other two are left open.

FIG. 6-d shows a panel with symmetrical patterns that reduce the likelihood that the panel will crack.

Figure 4:
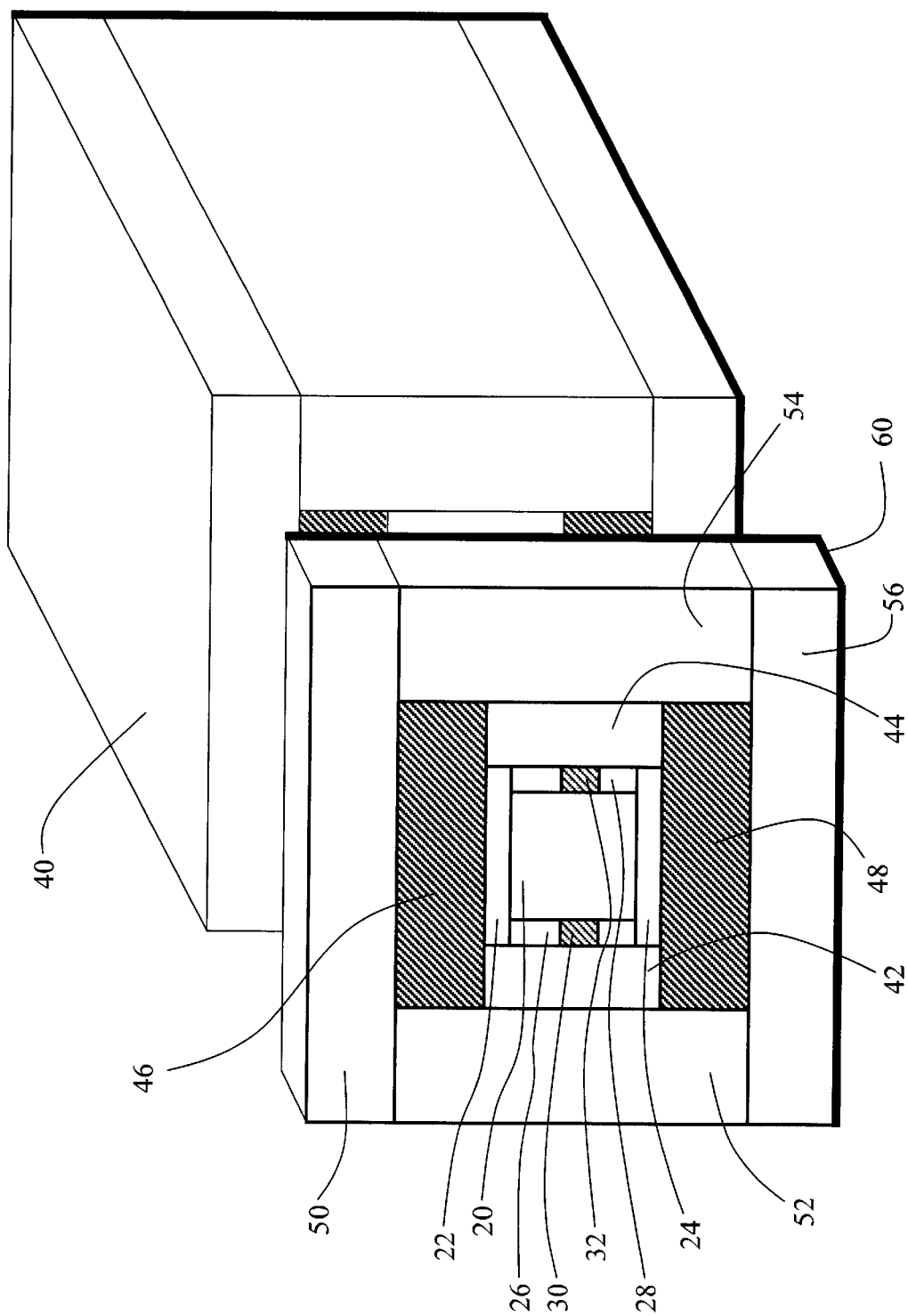
FIG. 4 shows a layer cut from the example blank to form a single panel. The remaining part of the blank is shown in the background for reference.
Figure 7:
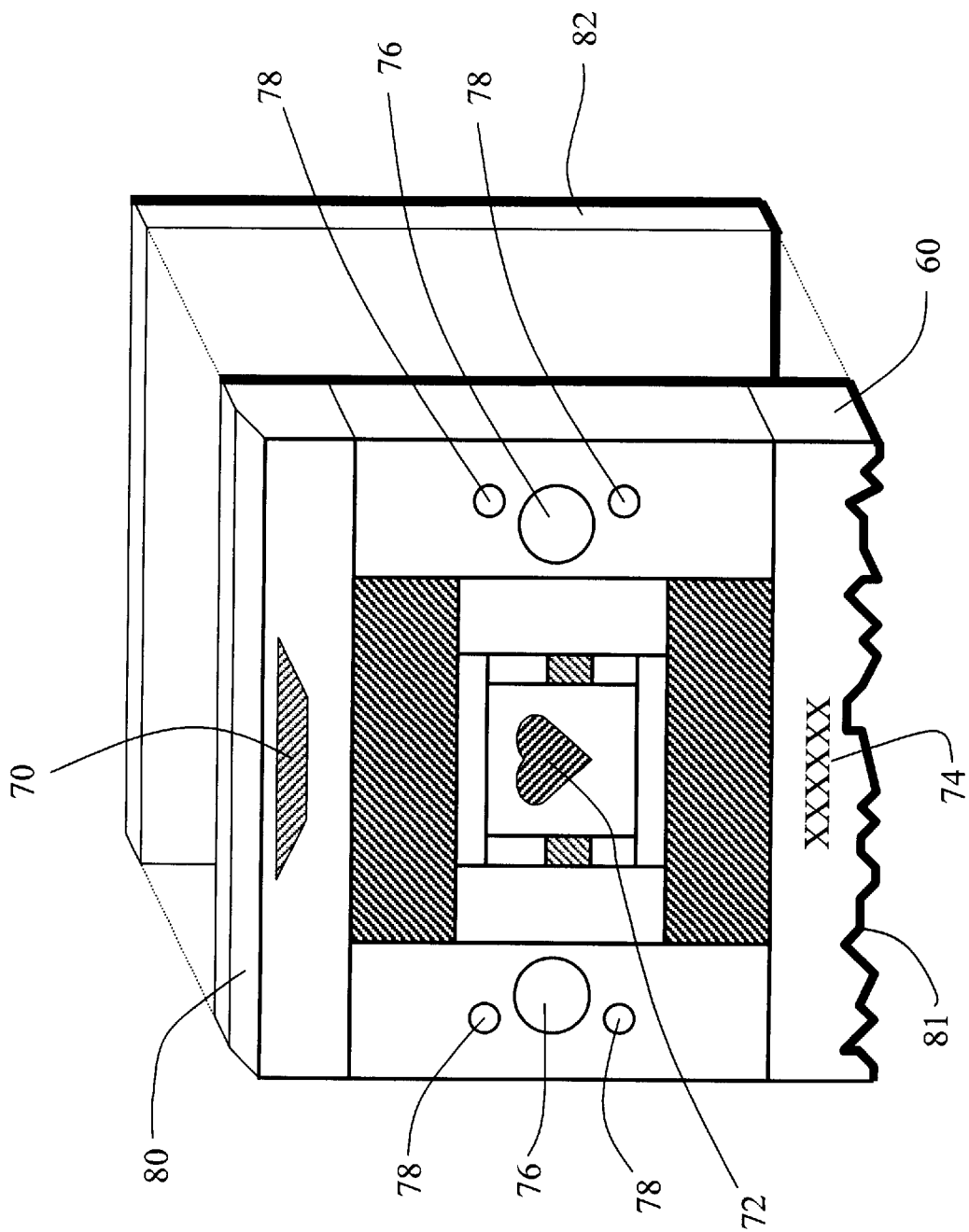

FIG. 7 shows the single panel produced in FIG. 4 with several enhancing modifications. Painted, engraved, drilled, broken, punctured, and inlayed modifications are shown. The top corner has been chamfered, and a backing plate is shown exploded away from the back of the panel.

FIG. 8-a shows a perspective view of a panel in a frame.

FIG. 8-b shows a side-view of a panel and frame so that a compliant material used to reduce stress between the panel and the frame and between the panel and the rigid support can be clearly shown.

Figure 9:
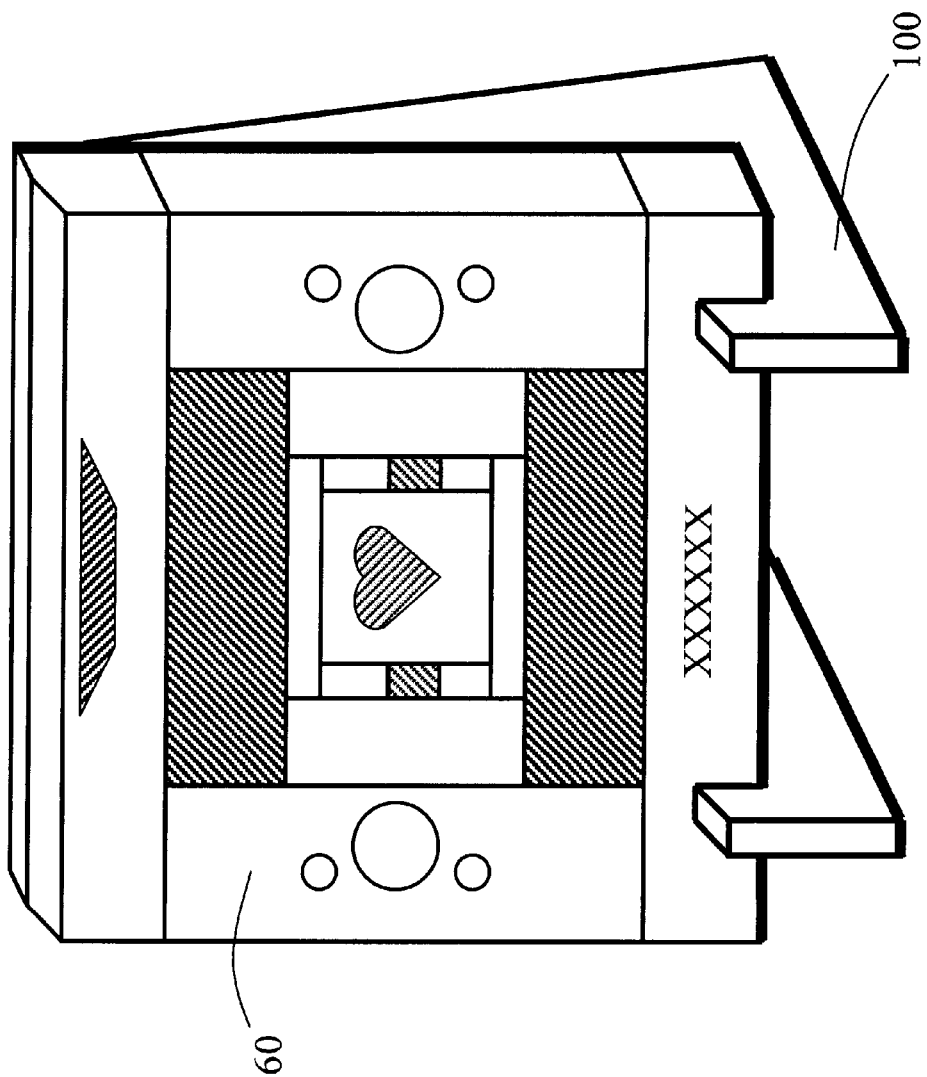

FIG. 9 shows a panel resting on a supporting stand.

Figure 10:
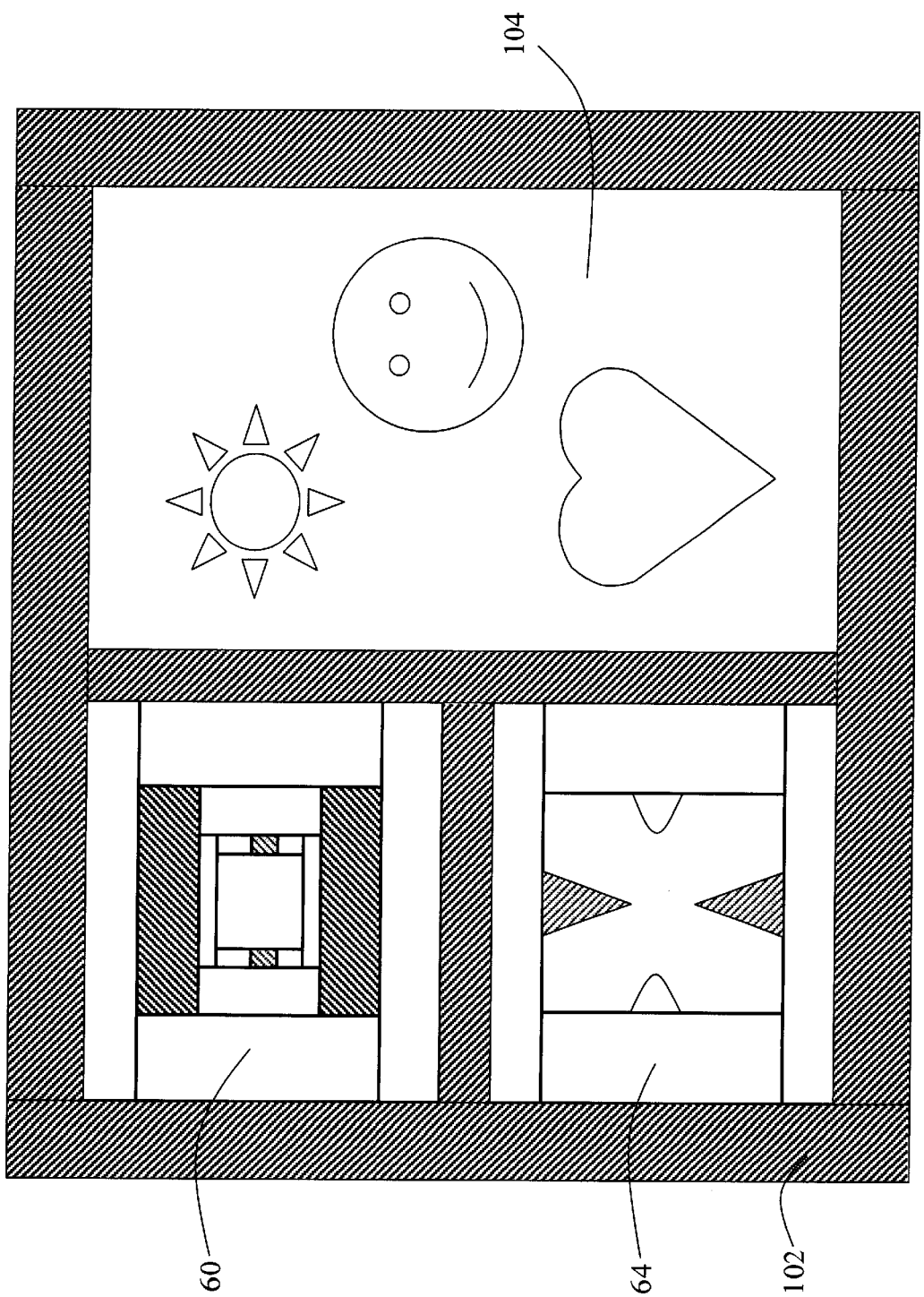

FIG. 10 shows a windowed frame with two end-grain panels and an alternative artform in the third window.

FIG. 11-a shows an exploded view of a finished panel and a mounting system including fasteners that are attached to a finished panel and connected to a supporting panel.

FIG. 11-b shows a side view of the finished panel and mounting system shown in FIG. 11-a.

| Reference Numerals in Drawings | |
|---|---|
| 10 | a typical article of artwork |
| 12 | features on the front surface of the artwork |
| 20 | blank center |
| 22 | top piece of first layer |
| 24 | bottom piece of first layer |
| 26 | left side piece of first layer |
| 28 | right side piece of first layer |
| 30 | center stripe in left side piece |
| 32 | center stripe in right side piece |
| 40 | blank |
| 42 | left side piece of second layer |
| 44 | right side piece of second layer |
| 46 | top piece of second layer |
| 48 | bottom piece of second layer |
| 50 | top piece of third layer |
| 52 | left side piece of third layer |
| 54 | right side piece of third layer |
| 56 | bottom piece of third layer |
| 60 | panel |
| 61 | reinforced panel |
| 62 | panel including center that was cut into sections and assembled with additional layers |
| 63 | reinforcing rods |
| 64 | panel including center that was routed |
| 65 | inserted layer |
| 66 | panel with symmetric features |
| 67 | common-sized piece |
| 68 | panel formed from pieces of common size |
| 69 | sub-assemblies sized to mate with common sized pieces |
| 70 | inlayed feature |
| 71 | filled routed feature |
| 72 | painted feature |
| 73 | open routed feature |
| 74 | engraved feature |
| 75 | symmetric ring |
| 76 | drilled hole |
| 78 | punctured hole |
| 80 | chamfered corner |
| 81 | broken edge |
| 82 | backing plate |
| 90 | frame |
| 92 | compliant material |
| 94 | rigid support |
| 100 | stand |
| 102 | windowed frame |
| 104 | alternate art form |
| 106 | fastener |
| 107 | front face of fastener |
| 108 | compliant material |
| 110 | upper opening |
| 112 | lower opening |
| 114 | supporting panel |
| 116 | screw |
| 118 | panel with multiple connected supporting means |

DESCRIPTION
FIGS. 1–4—PREFERRED EMBODIMENT

Figure 1:
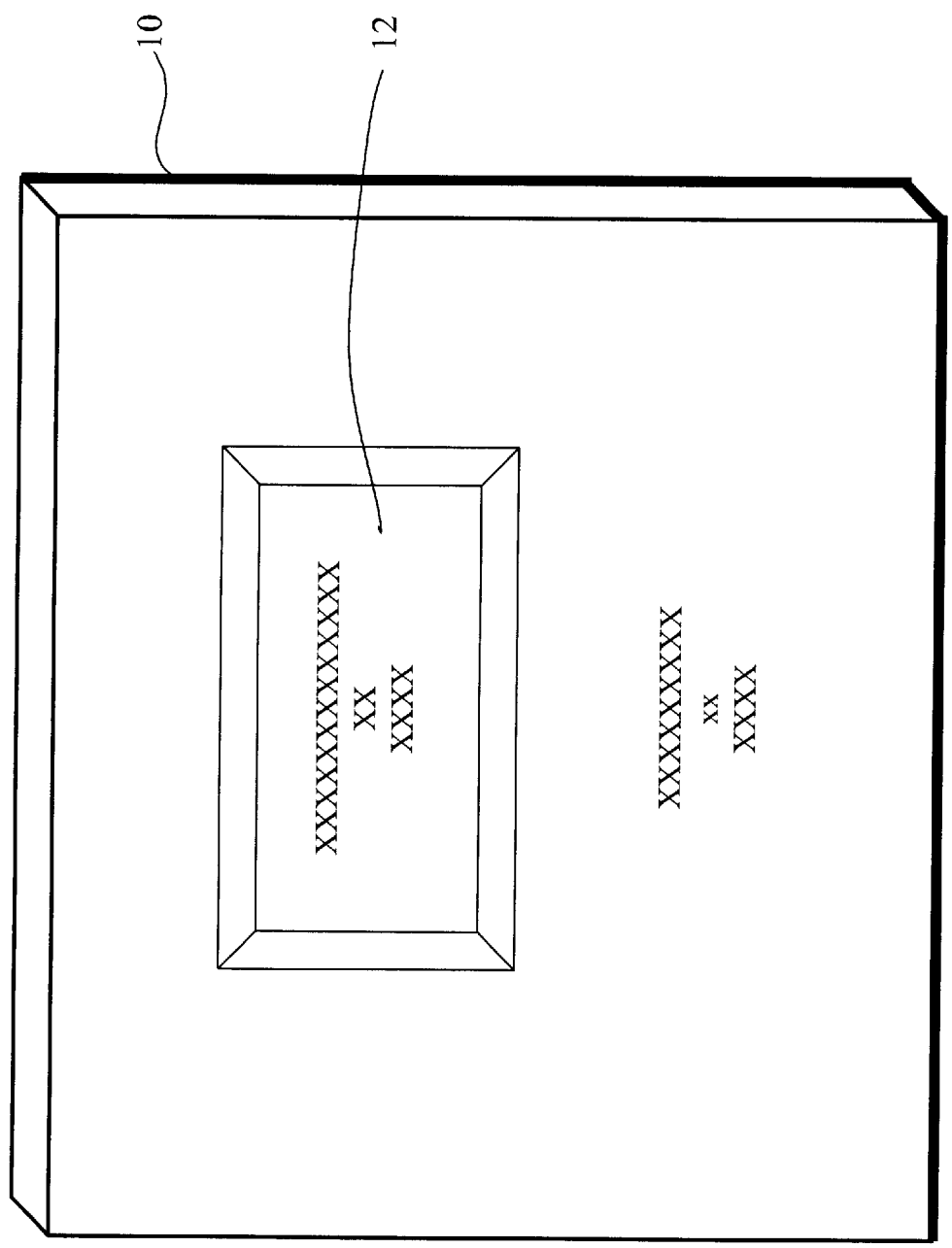
FIG. 1 shows a conventional display panel/plaque typical of those commonly used for display/artistic purposes. The panel and decorative and informative features are shown.

A typical article of artwork 10 is shown in FIG. 1. Such articles are commonly used for display or artistic purposes and may include informative or artistic features 12. Examples of articles of artwork that are the subject of this invention include plaques, panels, awards, pictures, coats-of-arms, displays, reliefs, ornaments, ornamental features that are part of another object such as a piece of furniture, and other items commonly used for visual display.

Figure 2:
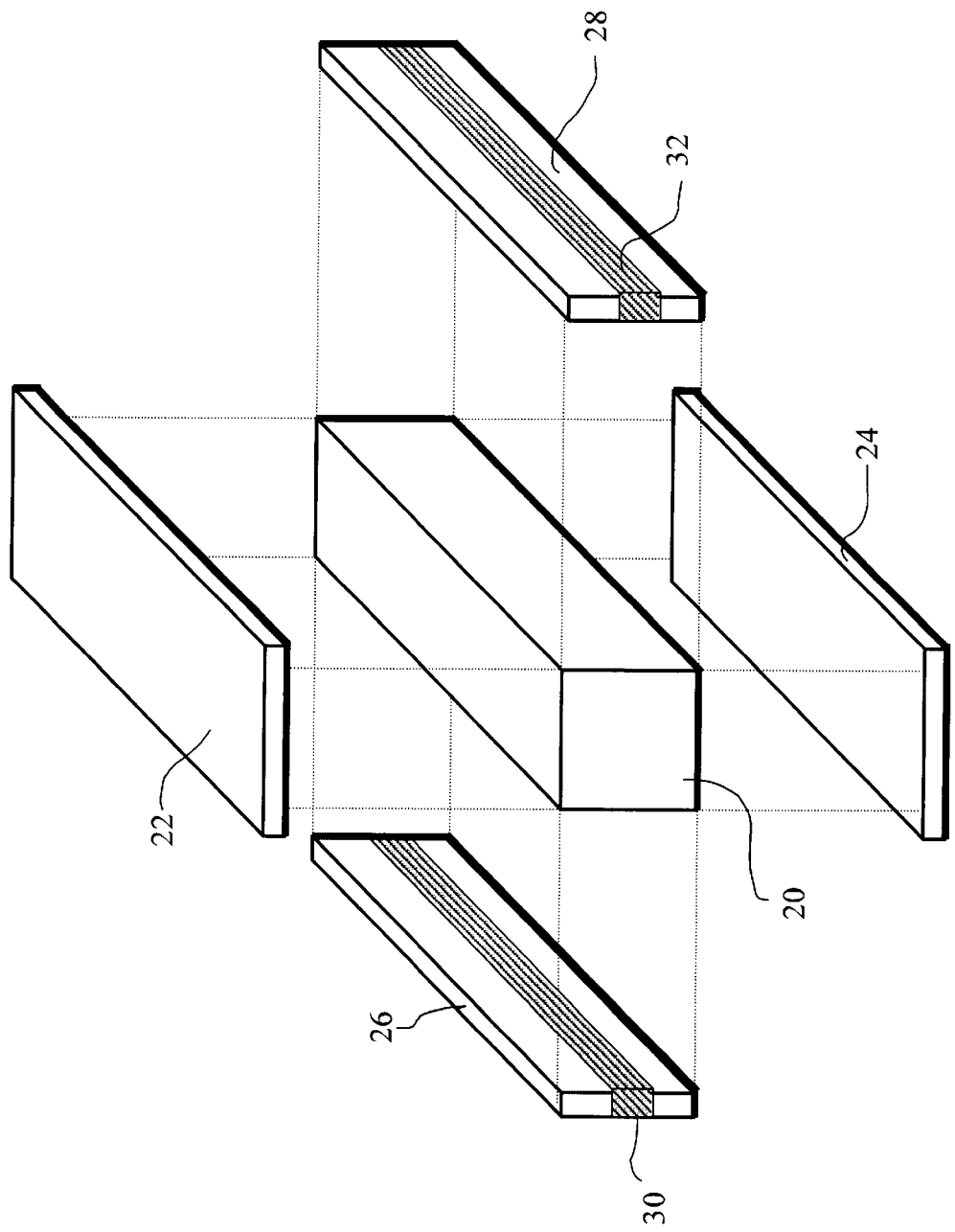
FIG. 2 shows an exploded view of the center piece and the four pieces that make up the first layer of an example blank. The side pieces include center stripes of a dark material.

The preferred embodiment for this invention involves construction of a blank and then cutting panels from one of the ends of the blank. In FIG. 2, an exploded view is shown of a partially completed blank. For the purposes of this patent application, a blank shall refer to either a fully or partially constructed blank. Since a larger blank can always be constructed from a smaller blank by adding layers of material to the smaller blank, no confusion results from this definition of a blank. The preferred embodiment explained here is constructed completely from wood, however, it is noted that other materials such as metals, plastics, ceramics, stone, composites, or other materials could be mixed with wood without significantly altering the methods employed. Incorporation of such materials, however, must include consideration of their expansion and contraction characteristics to ensure that destructive levels of stress do not result in cracking of the panel. The center section 20 is a piece of wood with it's long-grain direction extending along its length. Layers are bonded to center section 20 to form the blank. The right side piece of the first layer 28 and the left side piece of the first layer 26 are bonded to the center section 20 in a single or separate bonding operations. Note that piece 26 and piece 28 each include center stripes 30 and 32 that were formed by bonding a darker material between pieces of lighter material. Consequently, pieces 26 and 28 are constructed as subassemblies prior to being bonded to center section 20. The first layer is completed with the top piece of the first layer 22 and the bottom piece of the first layer 24 being bonded to the assembly formed from pieces 26 and 28 and center section 20. In this technique, each piece can be planed, sanded, or otherwise trimmed after it is bonded to the assembly. This provides a very convenient construction technique as no special material sizing or precision fitting is required to construct the blank.

Figure 3:
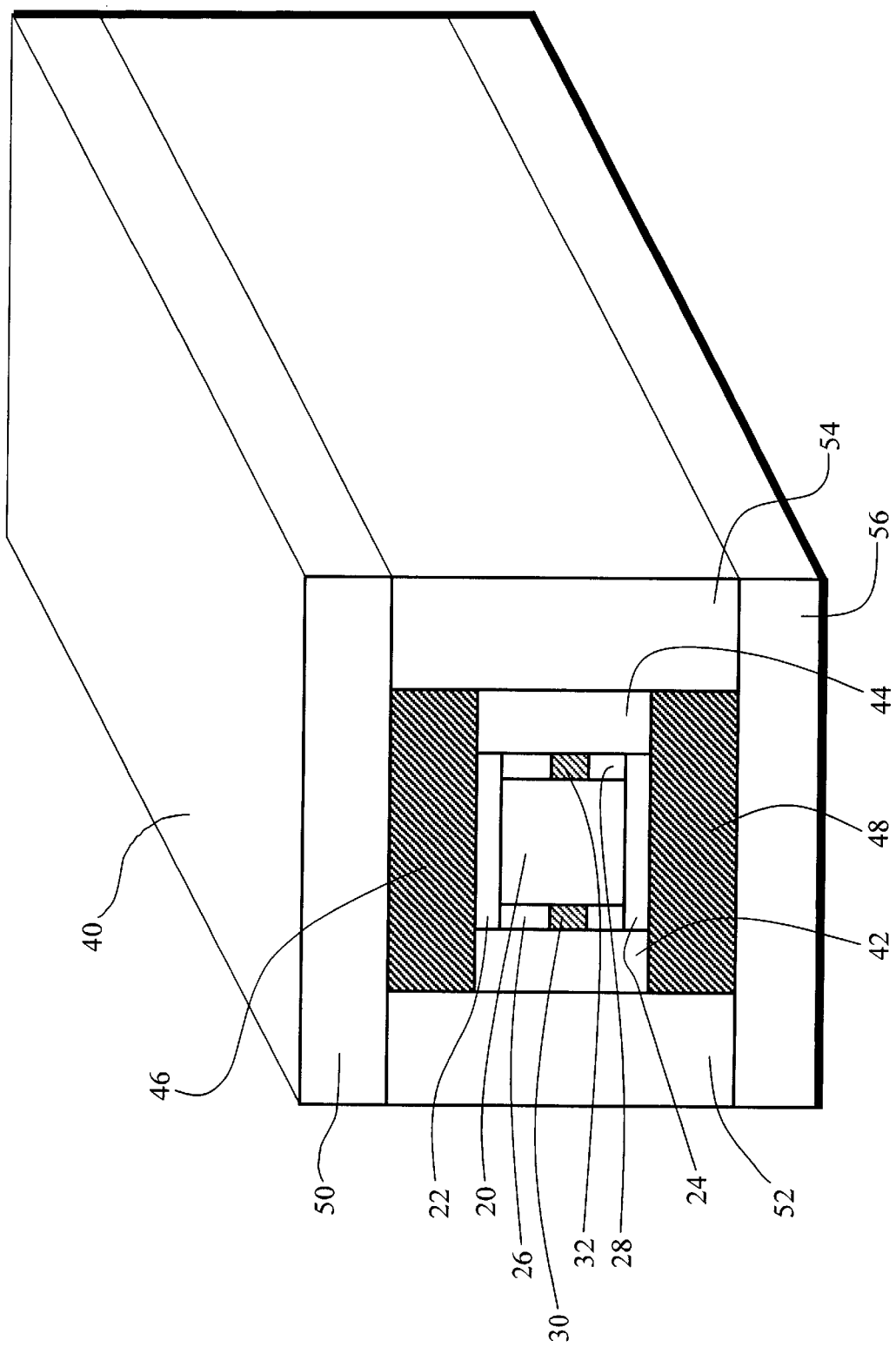
FIG. 3 shows a completed example of a laminated blank.

A completed blank 40 is shown in FIG. 3. The center section 20, pieces of the first layer 22, 24, 26, and 28; the pieces of the second layer 42, 44, 46, and 48; and the pieces of the third layer 50, 52, 54, and 56 are visible. All pieces in the blank have their long-grain patterns running in parallel such that the blank face shown in FIG. 3 is made up from the end-grain of each of the pieces. It is noted that the pattern shown in FIG. 3 is arbitrary with respect to the construction technique demonstrated. An unlimited number of patterns are possible by mixing woods, and possibly other materials, of various colors, textures, shapes, and grain patterns.

In FIG. 4, a completed panel 60 is shown separated from the blank 40. Normally, this separation would be completed using a sawing operation. In this patent application, the face of a panel 60 will refer to the front surface of the panel 60 on which the pattern is visible. The term front face will mean the same surface as the face, the back face will mean the surface opposite the front face. Note that many substantially similar panels can be produced from a single blank. A blank 40 can be constructed with sufficient length to produce a very large number of panels. It is important to note that since all the pieces used in the construction of the blank 40 had their long-grain patterns running substantially in parallel, the completed panel 60 retains this construction. Consequently, as the fibers in the wood expand and contract with temperature, humidity, or other environmental changes, the panel 60 will change in dimension, but high levels of stress will not be induced between the pieces making up the panel 60. If the pieces making up the panel do not have their long-grain patterns substantially in parallel, stress levels may result that cause the panel to warp or crack.

It is further noted that the completed panel 60 shown in FIG. 4 would normally be sanded smooth and finished using a standard finishing technique for wood. Varnish, laquer, shellac, oil, wax, or other finishing products could be applied. However, due to the nature of the end-grain surfaces on both the front and back faces of panel 60, it is beneficial that both the front and back faces of the panel 60 be finished using substantially similar techniques and amounts of finish. Failure to finish both faces of the panel substantially similarly may result in warping or cracking as moisture would enter or leave the opposite sides of the panel at different rates, resulting in significant stress as the opposite ends of the wood pieces expand or contract at different rates.

It is noted that FIG. 4 shows the case for a panel 60 being cut from the blank 40 at a right angle to the length of the blank 40 and with a straight cut. However, it is possible also to cut the panels from the blank at an angle in either the vertical or horizontal or both directions. Additionally, it is possible to cut the panel 60 using a curved cut so that the final panel 60 is not of uniform thickness.

FIGS. 5–11-b Additional Embodiments

Figure 5:
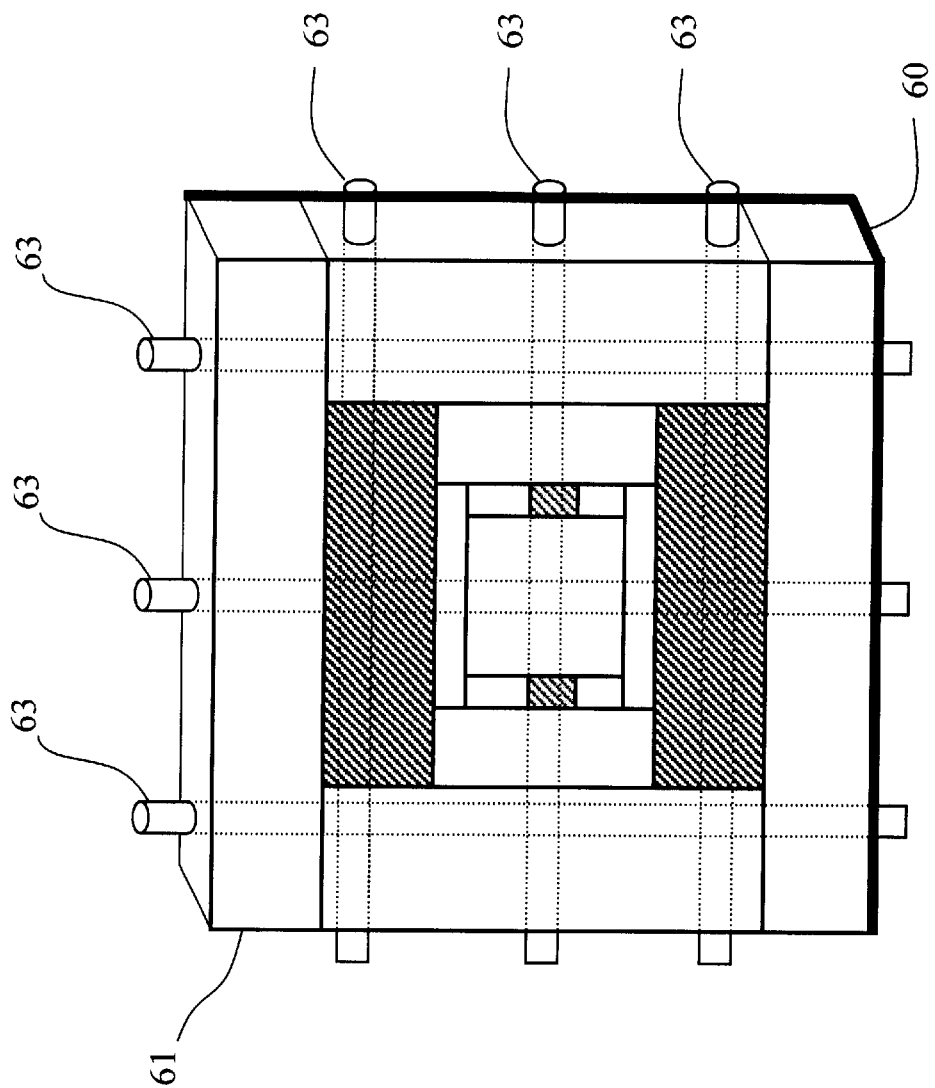
FIG. 5 shows a method for reinforcing a panel.

In FIG. 5, a reinforced panel 61 is shown. Two methods of producing a reinforced panel 61 are described. In the first method, the panel 60 is drilled and reinforcing rods 63 are inserted. In the second method, the completed blank 40 (shown in FIGS. 3 and 4) is drilled and the reinforcing rods 63 are installed before the panel 61 is separated from the blank 40. The first method can be difficult for large, delicate panels and it is possible that the panel will crack or be otherwise destroyed by the drilling operation. In the second method, the blank 40 provides substantial strength so that the panel may be easily drilled and reinforced prior to separation of the panel 61. In either method, the reinforcing rods 63 may be of wood, metal, plastic, composite, fiberglass, or other materials. The rods 63 may be bonded in place or only pressed into the drilled holes. In fact, the rods may be sized relative to the holes drilled so that they float freely in the holes. Threaded rods may be employed so that nuts and washers can be added to provide compressive force on the panel. Methods employing spring loading to provide uniform force as the panel expands and contracts can be helpful. Finally, other forms of rod fasteners in additional to threading and nuts can be employed. In particular, fasteners that are crimped, threaded, compressed, or otherwise bonded to the rods are possible.

In addition to the method shown in FIG. 5, other methods for reinforcing a panel 60 are possible. These include bonding reinforcing layers to the back or front of the panel, inserting the panel into a compressive frame and wrapping the panel about its outer perimeter with tape or wire.

In FIG. 6, additional construction techniques are shown. In FIG. 6-a, a panel formed from pieces of common size 68 is shown. The blank from which it was cut was formed in a single bonding operation. Note that the many common sized pieces 67 shown in FIG. 6-a, from which the blank was formed are all of a common cross-sectional end dimension or an integer multiple of this dimension as for subassemblies 69. However, the same assembly technique can also be applied to pieces that are of different sizes and even pieces that are of both different shapes and sizes. The benefit of this technique is that the entire blank can be formed in a single bonding operation. It is noted that the common-sized pieces need not be square for this technique to be applied. Rectangular, square, triangular, hexagonal, or other shaped pieces could be used as well. Circular, oval, or other shapes that don't provide a tight fit could also be used. Using such shaped materials that do not provide a tight fit will leave small openings between the pieces, however, in some designs this effect could be desired. It is also possible to use pieces that are not of a common size or neither of a common size or shape and to bond the pieces together in a single bonding operation to form a blank.

In FIG. 6-b, a panel including center that was cut into sections and assembled with additional layers 62 is shown. The blank used to form the panel was constructed in part by cutting a partially completed blank into sections and then inserting additional material layers 65 between the sections before bonding the partial blank back together. As shown in FIG. 6-b, a relatively simple pattern has been created, however, the partially completed blank can be cut apart and reassembled multiple times to create complex patterns. That is, the technique can be applied over and over again. Note that the blank can be cut apart at any angle, using straight or curved cuts. In this way, the panels cut from the blank may not be substantially identical as the pattern on the end of the blank will change as each panel is cut if this technique is applied using an angled cut across the blank. Care must be taken in such a case to keep the grain patterns of the blank and the inserted layers substantially parallel to avoid stress problems leading to cracking of the completed panels.

In FIG. 6-c, a panel including a center that was routed 64 is shown. The blank used to form the panel was cut using a routing or machining operation to form routed features 71 and 73. The filled routed features 71 have been filled with a darker material, while the open routed features 73 have been left open and unfilled. Of course, such a technique could be applied with a wide variety of shapes to create interesting filled or unfilled patterns in the complete blank. This technique can also be applied multiple times to various layers as the blank is formed.

In FIG. 6-d, a panel with symmetric features 66 is shown. The blank used to form the panel was formed with a symmetric ring 75. In fact, multiple symmetric rings are included. Such a symmetric ring is helpful to balance stress in the panel and improve its resistance to cracking. Since fully symmetric patterns will not be desired in all cases, it is helpful to incorporate symmetric rings and some symmetric features into panels where possible. Use of one material type on one side of a panel could be balanced with use of the same material on the other side, possibly using a variation in the shape or placement of the material. It is also possible to include approximately symmetric rings and features by balancing one material with another that has similar expansion/contraction characteristics but is possibly of a different color, texture, or grain pattern.

It is noted that the techniques shown in FIGS. 6-a through 6-d, and the technique shown in FIG. 2 can be combined to produce advantage. For example, the center section 20 shown in FIG. 2 could have been produced using the technique of FIG. 6-a. After the first layer pieces 22, 24, 26, and 28 are added, the method of FIG. 6-b could be employed to provide stripes extending through the subassembly. After the second layer is completed, the technique of FIG. 6-c could be used to add decoration, and the blank could be completed with a series of symmetrical rings as shown in FIG. 6-d. Clearly, a very wide number of combinations of these techniques is possible.

It is noted that multiple panels using some number of the construction techniques explained above, could be glued or otherwise bonded together along their edges to form a single larger panel. Multiple panels could also be bonded together partially overlapping to form a larger panel.

In FIGS. 2–6, several embodiments have been shown for end-grain panels and their construction. In FIG. 7, several techniques are shown for making enhancing modifications to a panel regardless of the blank's construction method. An inlayed feature 70, an engraved feature 74, a painted feature 72, drilled features 76, and punctured holes 78; have been added to the panel 60. The top edge of the panel 60 has been enhanced with a chamfer 80, and the bottom edge 81 has been broken to provide an artistic effect. A backing plate 82 is shown exploded away from the back of panel 60. Such a backing plate could be of a color or pattern of colors, possibly with specially chosen texture or pattern of textures that would be visible through hollow areas of the panel 60 or through the holes 76 and 78 in the panel 60. The backing plate 82 may be constructed from either rigid or flexible materials. Backing plates 82 made from materials such as cloth, fabric, plastic, rubber, paper, cardboard, metal, wood, felt, leather, and other materials are possible. In some cases, the backing plate 82 may extend beyond the edges of the panel to form decorative features. An example of using a backing plate in this way would be to extend a leather backing plate 82 beyond the panel 60 edges and include a pattern or shape in the leather overlapping the panel 60. To avoid stress and potential for cracking, the backing plate 82 would not normally be bonded to the panel 60 if the backing plate 82 were constructed from a rigid material. Instead, the panel 60 and the backing plate 82 would be supported through a means allowing some movement between them without introduction of substantial stress. It is noted that FIG. 7 includes only a small sample of the possible finishing features that could possibly be painted, routed, engraved, inlayed, cut, broken, drilled, bored, punctured, machined, stained, etched, textured, carved, countoured or otherwise applied to a panel 60. It us further noted that the surface of the panel 60 could be carved or contoured so that the panel was no longer of uniform thickness. Decorative features could also be bonded to the surface of the panel.

A panel 60 constructed as described in this patent application is especially suited to enhancing features formed by partially breaking or puncturing the panel. As noted above, the punctured holes 78 and the broken edge 81 are formed in this manner. Since the wood fibers in the panel are perpendicular to the panel face, broken and punctured features can be formed easily. In conventional panels, where the wood fiber is parallel to the panel face, breaking or puncturing processes are very hard to control. In this patent application, a feature formed by breaking away a region of a panel 60 shall refer to any feature that is formed by breaking, puncturing, cleaving, chipping, or otherwise similarly removing material from a panel 60.

As noted above with regard to FIG. 4, both sides of the completed panel 60 would normally be finished using similar techniques. It is noted here, with reference to FIG. 7, however, that small finishing features, such as those shown in FIG. 7, can normally be added to one side of the panel 60, without creating destructive levels of stress in the panel 60.

It is further noted with regard to FIG. 7 that the addition of decorative or finishing features to the panel 60 can be done before or after the panel 60 is separated from the blank 40. In some cases, the stress induced in the panel 60 due to the operation being performed may be sufficient to break the panel 60 if the operation is performed after the panel 60 is separated from the blank 40. In these cases, the additional strength of the blank can be used to advantage and most operations can be easily applied to the panel 60 before it is separated from the blank 40. Operations that induce high levels of stress such as boring, drilling, burning, and cutting would generally benefit from this technique.

In FIG. 8-*a*, the panel 60 is shown mounted into a supporting frame 90. In FIG. 8-*b*, compliant supporting material 92 is shown between the frame 90 and rigid support 94 and the panel 60. The compliant material 92 is important to ensure that expansion and contraction of the panel 60 does not result in stress against the frame resulting in cracking or failure of either the frame 90 or the panel 60. A wide variety of possible compliant materials exist including metal springs, rubber, foam, sponge, and similar materials. The compliant material may also be an air space between the frame 90 and panel 60 and rigid support 94. Incidentally, it is noted that a backing plate 82 may be included in the frame 90 behind the panel 60.

In FIG. 9, a panel 60 is shown resting on a stand 100. The stand 100 has been constructed to support the panel 60 while allowing it to expand or contract without creating stress between the stand 100 and the panel 60. Other methods, such as hanging a panel 60 from an eyelet; using a drop of glue or adhesive to adhere a small spot on a panel 60 to a surface, or other similar means for supporting the panel 60 that avoid stress are also possible.

In FIG. 10, a first panel 60, a second panel 64, and an alternate art form 104, are shown mounted in a windowed frame 102. The alternate art form 104 could be a painting, cutting, engraving, quilt, or any other possible art form that could be mounted into a frame. Mixing the display of end-grain panels with various other art forms either in the same or different mounting means is possible.

In FIG. 11-*a* and FIG. 11-*b*, a panel 60, is mounted to a supporting panel 114, by means of fasteners 106 that are attached to panel 60 and fastened to supporting panel 114 to form a panel with multiple connected supporting means 118. The fasteners 106 are shown positioned in the supporting panel 114 with two of them exploded forward to clarify the nature of the fastener and mounting process. The front face 107 of each fastener 106 is attached to the panel 60. Such attachment could be achieved with glue, adhesive, a mechanical fastener such as a screw or rivet, or other attaching means. In one embodiment, the fasteners 106 are made from strips of aluminum, however, other metals, plastics, paper, cardboard, or other materials could also be employed. After they are attached to the panel 60, the end of the fasteners 106 extending away from the panel 60 are fitted through the upper openings 110 and lower openings 112 in supporting panel 114. The section of the fasteners extending past the back of the supporting panel 114 are bent over, securing the panel 60 to the supporting panel 114. In FIG. 11-*b*, a side view of the completed assembly 118 is shown and the bent fasteners 106 are clearly visible. It is noted that the upper openings 110 and the lower openings 112, are made sufficiently large to allow for expansion and contraction of the panel 60. In FIG. 11-*a* and FIG. 11-*b*, the fasteners 106 in the upper openings 110 rest on the lower edge of the actual opening. In effect, the panel 60, hangs on the lower edge of the upper openings 110 and gains vertical support in this fashion. However, lateral expansion and contraction of panel 60 is accommodated by allowing the fasteners 106 to slide laterally in the upper openings 110. The fasteners 106 in the lower openings 112 are centered in the openings such that the fasteners 106 can slide either vertically or laterally in the lower openings 112. By allowing lateral movement of the fasteners 106 in the upper openings 110 and both vertical and lateral movement of the fasteners 106 in the lower openings 112, expansion and contraction of the panel 60 relative to the supporting panel 114 is fully accounted for and the requirement of a mounting system that avoids transferring stress to the panel 60 is fully met.

Movement of the panel 60 relative to the supporting panel 114 may be undesirable in some cases. In such a case, a single screw 116 may be added to fix one of the fasteners in such a mounting system in a fixed position to the supporting panel 114. Such a mounting screw, creates a point of reference between the panel 60 and the supporting panel 114. In FIG. 11-*b*, the screw 116 is show fixing the fastener 106 to the supporting panel 114. However, it is also possible to extend the screw 116 and directly mount the panel 60 to the supporting panel 114 in one point or, alternately, to put the screw 116 though the front face of panel 60 into the supporting panel 114 such that the screw is visible from the front of the completed work. Such methods for creating a point of reference between the panel 60 and supporting panel 114 are especially useful in cases where multiple panels 60 are mounted to a supporting panel 114 and relative positioning of the panels must be maintained. Here, a single screw 116 is shown used to fix the panel 60 to the supporting panel 114 at one point. However, other fastening or mounting means, such as nails, bolts, wedges, pins, rivets, dowels, glue, adhesive or other means can be used to similarly create a point of reference between the panel 60 and the supporting panel 114.

Both FIG. 11-a and FIG. 11-b show a buffering material 108 between the panel 60 and the supporting panel 114. This buffering material may be included to provide compliance in the mounting system and allow the panel 60 and supporting panel 114 to slide past each other more smoothly as panel 60 expands and contracts. Materials such as felt, cloth, rubber, plastic, Nylon, metals, wood, and other materials are suitable for use as a buffering material 108. In FIG. 11-a and FIG. 11-b, the buffering material 108 is show applied as four discrete circular pieces. However, many different numbers of pieces in many different configurations are possible. In fact, in some cases the buffering material may cover the full surface area where the panel 60 and supporting panel 114 mate, or possibly an even larger area.

It is noted that supporting panel 114 may not extend to fully back the panel 60. Such a situation is illustrated along the lower edge of panel 60 in FIG. 11-a and FIG. 11-b. This technique allows panel 60 to appear to float in front of a wall on which the panel with multiple connected supporting means 118 is displayed. In the opposite fashion, supporting panel 114 may extend beyond panel 60 in some areas allowing supporting panel 114 to enhance the effect of the panel with multiple connected supporting means 118. In such a case, supporting panel 114 may be decorated, painted, stained, finished, or otherwise enhanced. Additionally, it is noted that the supporting panel 114 can also act in the manner of the backing plate 82 to provide a surface that can be painted, stained, finished, or otherwise enhanced to provide artistic effects through holes that may be drilled, punctured, broken or otherwise provided in panel 60. It is also noted that the supporting panel 114 and fasteners 106 provide mechanical support to panel 60. Such support allows panel 60 to be cut thinner than would otherwise be possible. It also allows larger panels 60 to be used than would otherwise be possible. The precise benefit in terms of the thickness of panel 60 and the maximum dimension across it's face is a function of many variables including the specific materials and pattern created; the number of fasteners 106 that are used; the strength of the supporting panel 114; and the degree of stress the panel 60 is subjected to. However, as a general guide, mounting panels 60 using a supporting panel 114 and fasteners 106 allow panels 60 that are larger than ten inches across their face and less than three-eighths of an inch thick. It is also possible to mount a panel 60 using a supporting panel 114 and fasteners 106 where the blank 40 used to form the panel 60 is not laminated, but is formed from a single piece of wood.

The mounting means of FIG. 11-a and FIG. 11-b shows one embodiment using fasteners 106 attached to panel 60 and affixed to supporting panel 114. However, many alternatives exist that are of a similar nature. For example, instead of using fasteners 106 attached to panel 60 and extending through supporting panel 114, bolts and nuts might be used to directly fasten the panel 60 to the supporting panel 114. In such a case, sufficiently large openings in the supporting panel 114 could be provided to allow for movement between the panel and the supporting panel to avoid stress. Using screws through the face of panel 60 into the supporting panel 114 with sufficiently large holes in panel 60 to allow for movement between the panels is also possible. Of course, this same means could be reversed with the screws coming from behind the supporting panel 114 and into panel 60 from the back, in which case the large holes needed to provide movement would be in supporting panel 114. The method of FIG. 11-a and FIG. 11-b, therefore, includes all such methods of mounting a panel 60 to a supporting panel 114 in such a way to avoid stress between the panels irrespective of whether that means includes screws, bolts and nuts, clips, adhesive, glue, nails, rivets, pegs, wedges, cleats, dowels, guides, or other means. In addition, the method of FIG. 11-a and FIG. 11-b include the use of any number of fasteners and is not limited to the use of six fasteners as shown in the figures.

Advantages

From the description above, a number of advantages of the present invention are clear:

a) Complex, interesting patterns can be produced in a wooden panel without the need for highly specialized skills or time consuming techniques.
b) Large panels featuring highly visible end-grain can be produced.
c) A large number of substantially similar panels can be produced from the same blank so that the cost of producing each panel is reduced.
d) Panels can be bonded together to create larger structures.
e) Use of parallel long-grain orientation of the pieces used to construct the blank ensures that the completed panel will be resistant to cracking.
f) Construction techniques for building blanks layer by layer, bonding small similarly sized pieces all at once, cutting and reassembling sub-assemblies, and routing features into subassemblies are possible.
g) The addition of symmetrical rings or features can be used to reduce stress levels in the completed panel.
h) Techniques for reinforcing a panel either before or after it is separated from the blank help to ensure stability in large panels.
i) Methods for mounting completed panels that reduce stress between the mounting means and the panel to reduce the likelihood of cracking.
j) Methods for mounting completed panels that reduce stress between the mounting means and the panel to reduce the likelihood of cracking and also provide additional support to the panel so that thinner panels and panels of larger dimension can be utilized.
k) Methods for painting, inlaying, engraving, carving, staining, drilling, puncturing, boring, routing, texturing, machining, etching, contouring, cutting, breaking, or otherwise applying finishing features into or onto the panels.
l) Methods for creating finishing features in the panel that induce high stress levels can be applied to the panel before it is separated from the blank to avoid breaking it.
m) Panels can be mounted with other panels and/or with other art forms.

CONCLUSIONS, RAMIFICATIONS, AND SCOPE

The benefits of the present invention should be clear. It offers a means to produce panels that include complex and interesting patterns. Only reasonable levels of skill are required and the panels can be produced at reasonable cost since several similar panels are made from the same blank. Various wood types can be used to create artistic effects with different colors, textures, and grain patterns. End-grain is fully visible in the panels. Panels sufficiently large for display and artistic purposes can be produced with sufficient stability to avoid cracking with proper mounting and care. Mounting techniques that reduce stress are provided. Mounting and supporting techniques are further provided that allow thinner and larger panels to be practically utilized. Several variations in construction techniques are provided to produce various effects. The blank from which the panels are cut can be built up using layers and subassemblies; many pieces and subassemblies bonded in a single operation; cutting the blank apart and reassembling it with additional layers inserted; and by combinations of the above techniques. Symmetrical rings and approximately symmetrical features can be combined in panel designs to improve stability. Reinforcing means can be added before or after the panel is cut from the blank. Enhancing modifications including engraved, routed, cut, broken, drilled, bored, punctured, painted, etched, textured, inlayed, carved, stained, machined or contoured patterns; chamfering, shaping, or other decorative techniques; and backing plates can be added to enhance the overall appeal of the completed panel.

Although the description above contains many specificities, these should not be construed as limiting the scope of the invention, but as merely providing illustrations of some of the presently preferred embodiments of this invention. Thus the scope of the present invention should be determined by the appended claims and their legal equivalents, rather than by the examples given.

I claim:

1. An article of artwork comprising:
    a) a panel having a front surface, a back surface, a thickness, a vertical dimension across said front surface, and a horizontal dimension across said front surface; said panel comprising a plurality of securely adhered pieces of material with one or more of said pieces of material being wood and wherein said pieces of wood are oriented so that end grain is visible on said front surface of said panel, and where each of said pieces of material is securely adhered to at least one other of said pieces of material, and
    b) a supporting panel mounted behind said panel and a plurality of fasteners connecting said panel to said supporting panel, where said fasteners are adjoined to said front surface or said back surface of said panel so that said panel is allowed to expand or contract in said vertical dimension or said horizontal dimension without inducing significant stress on said panel.

2. The article of artwork of claim 1 wherein said fasteners are affixed to said panel with glue, adhesive, a mechanical fastener such as a screw or rivet, or other suitable methods.

3. The article of artwork of claim 1 wherein said plurality of fasteners comprises strips of material affixed to said back surface of said panel and connected to said supporting panel, said strips of material comprising aluminum or other metals, plastic, paper, cardboard, or other suitable material.

4. The article of artwork of claim 1 wherein said plurality of fasteners comprises strips of material affixed to said back surface of said panel and connected to said supporting panel through openings provided in said supporting panel, said strips of material comprising aluminum or other metals, plastic, paper, cardboard, or other suitable material.

5. The article of artwork of claim 1 wherein said plurality of fasteners are applied so that a point of reference is established between said panel and said supporting panel, and said panel is allowed to expand or contract without inducing significant stress on said panel.

6. The article of artwork of claim 1 wherein said panel is enhanced with engraved, drilled, carved, routed, painted, stained, etched, cut, bored, textured, machined, contoured, inlayed or other features.

7. The article of artwork of claim 1 wherein said supporting panel is painted, stained, finished, or otherwise enhanced.

8. The article of artwork of claim 1 wherein said vertical dimension or said horizontal dimension of said panel is greater than ten inches.

9. The article of artwork of claim 1 wherein some number of said pieces of material have a common size, and said pieces of material having a common size are arranged symmetrically about the center of said front surface of said panel, so that stress caused by expansion and contraction of said pieces of material having a common size is balanced and the net stress on said panel is substantially reduced.

10. The article of artwork of claim 1 wherein said panel is enhanced by breaking away regions of said panel to form broken edges or punctured holes.

11. The article of artwork of claim 1 wherein said panel is constructed from a single piece of wood with said single piece of wood oriented so that end grain is visible on said front surface of said panel.

12. The article of artwork of claim 1 wherein said supporting panel also provides support for mounting one or more additional forms of art other than said panel or for mounting multiple said panels.

13. The article of artwork of claim 1 wherein buffering material is included between said panel and said supporting panel, and where said buffering material enhances the ability of said panel to expand or contract in said vertical dimension or said horizontal dimension without inducing significant stress on said panel.

14. The article of artwork of claim 13 wherein said buffering material is felt, cloth, nylon, rubber, plastic, metal, wood, or other suitable material.

15. An article of artwork comprising:
    a) a panel having a front surface, a back surface, a thickness, a vertical dimension across said front surface, and a horizontal dimension across said front surface; said panel comprising a plurality of securely adhered pieces of material with one or more of said pieces of material being wood and wherein said pieces of wood are oriented so that end grain is visible on said front surface of said panel, and where each of said pieces of material is securely adhered to at least one other of said pieces of material, and
    b) a supporting structure onto which said panel is mounted, said supporting structure providing support to said panel and allowing said panel to move relative to said supporting structure so that said panel may expand or contract in said vertical dimension or said horizontal dimension, and
    c) a plurality of fasteners connecting said panel to said supporting structure, where said fasteners are adjoined to said front surface or said back surface of said panel so that said panel is allowed to expand or contract in said vertical dimension or said horizontal dimension without inducing significant stress on said panel.

16. The article of artwork of claim 15 wherein said plurality of fasteners comprises screws, bolts, nuts, clips, nails, rivets, pegs, wedges, cleats, dowels, guides, or other fasteners.

17. The article of artwork of claim 15 wherein said panel further comprises reinforcing rods inserted through said panel substantially in parallel with said front surface of said panel.

18. The article of artwork of claim 17 wherein said reinforcing rods impart compressive force on said panel.

19. An article of artwork comprising:
  a) a panel having a front surface, a back surface, a thickness, a vertical dimension across said front surface, and a horizontal dimension across said front surface; said panel comprising a plurality of securely adhered pieces of material with one or more of said pieces of material being wood and wherein said pieces of wood are oriented so that end grain is visible on said front surface of said panel, and where each of said pieces of material is securely adhered to at least one other of said pieces of material, and
  b) a frame into which said panel is mounted and compliant material included between said panel and said frame so that said panel is allowed to expand or contract in said vertical dimension or said horizontal dimension without inducing significant stress on said panel.

20. The article of artwork of claim 19 wherein said compliant material comprises metal springs, rubber, foam, sponge, an air space, or other suitable materials.

21. The article of artwork of claim 19 wherein some number of said pieces of material have a common size, and said pieces of material having a common size are arranged symmetrically about the center of said front surface of said panel, so that stress caused by expansion and contraction of said pieces of material having a common size is balanced and the net stress on said panel is substantially reduced.

22. The article of artwork of claim 19 wherein said panel has a coating of a finishing product substantially uniformly on both said front surface and said back surface of said panel.

23. The article of artwork of claim 19 wherein said panel is enhanced by breaking away regions of said panel to form broken edges or punctured holes.

24. The article of artwork of claim 19 wherein tape or wire is wrapped about the outer perimeter of said panel.

25. The article of artwork of claim 19 wherein said frame also provides support for mounting one or more additional forms of art other than said panel or for mounting multiple said panels.

26. The article of artwork of claim 19 wherein a backing plate is included behind said panel and is fastened in said frame so that said panel is allowed to expand or contract in said vertical dimension or said horizontal dimension without inducing significant stress on said panel, said backing plate comprising cloth, fabric, plastic, rubber, paper, cardboard, metal, wood, felt, leather, or other suitable materials.

* * * * *